UNITED STATES PATENT OFFICE.

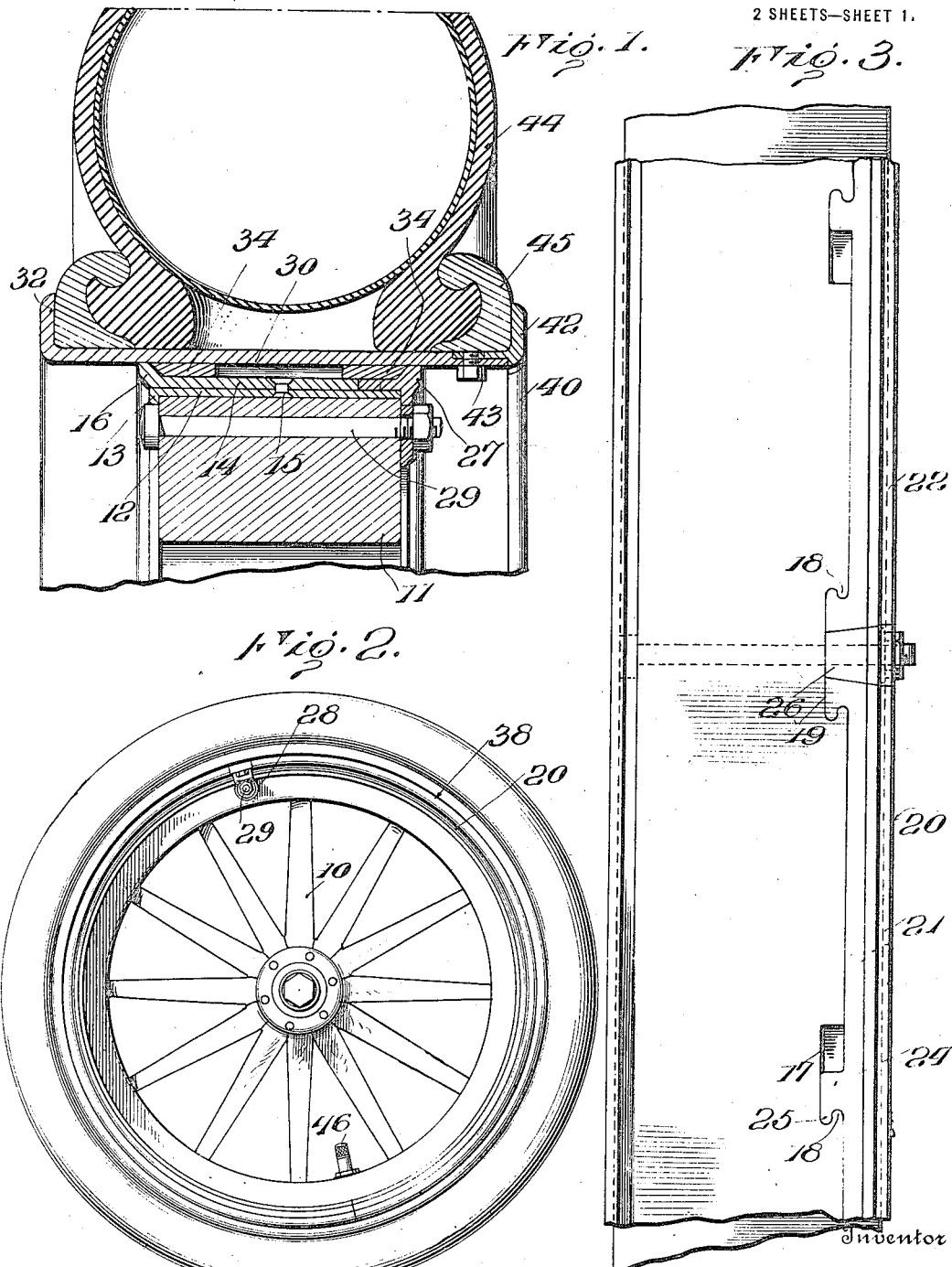

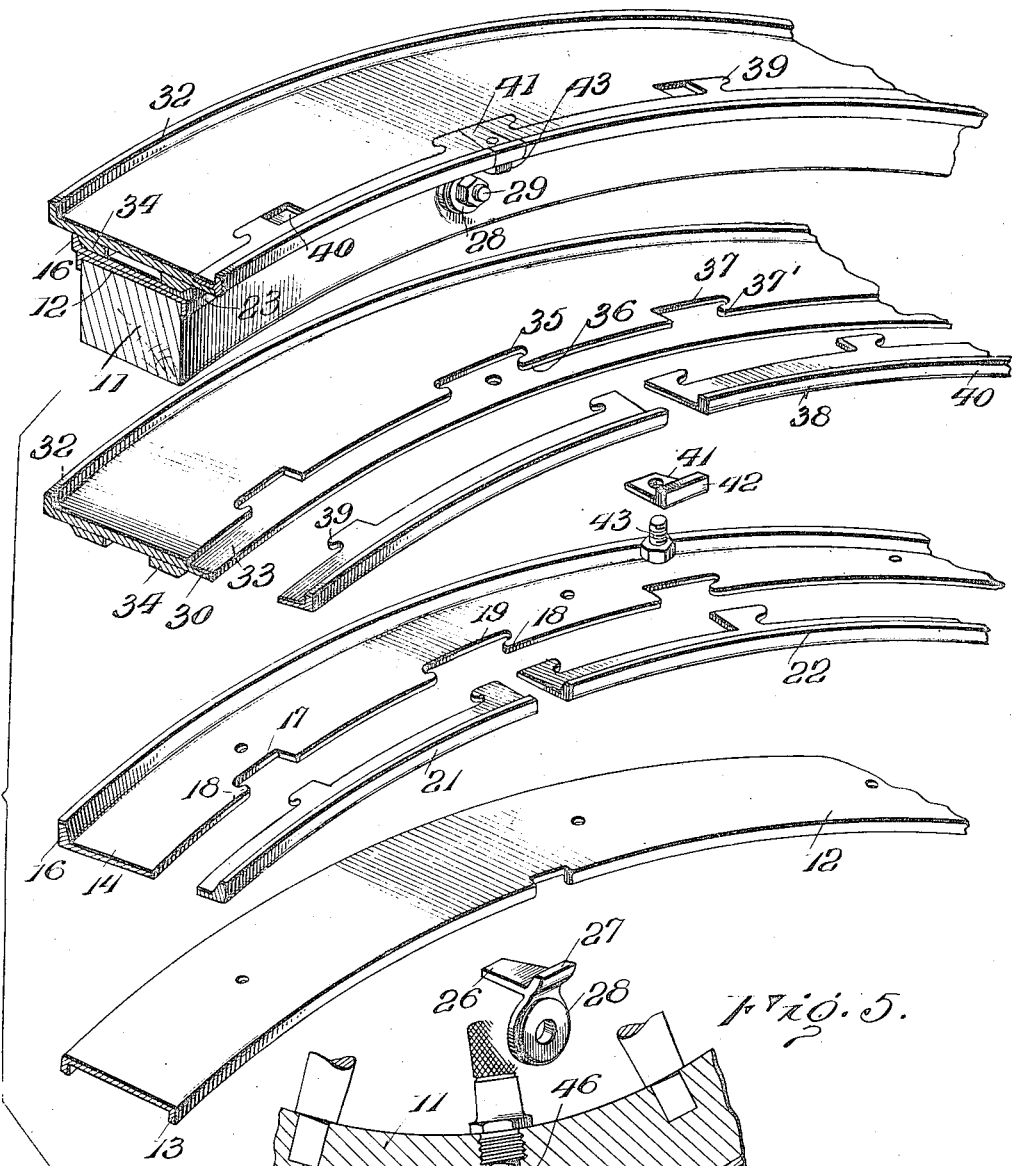

GEORGE H. PARKS, OF LOMAX, ILLINOIS.

DEMOUNTABLE RIM.

1,224,012.
Specification of Letters Patent.
Patented Apr. 24, 1917.

Application filed November 10, 1914. Serial No. 871,297.

*To all whom it may concern:*

Be it known that I, GEORGE H. PARKS, a citizen of the United States, residing at Lomax, in the county of Henderson and State of Illinois, have invented certain new and useful Improvements in Demountable Rims, of which the following is a specification.

This invention relates to certain new and useful improvements in demountable rims for vehicle wheels and more particularly to an improved construction especially adapted for use in connection with the wheels of motor vehicles wherein a pneumatic tire is employed.

The invention has as its primary object to provide a rim of this character which may be quickly removed from the wheel with ease and facility and wherein but a single fastening device or means will be employed for maintaining the rim in operative position upon the wheel.

The invention has as a further object to provide in a rim of this character an efficient type of locking means for maintaining the rim in position upon the wheel and wherein the said means may be easily actuated to effect the release of the rim.

A further object of the invention is to provide an improved rim wherein but a single fastening means will be employed for operatively connecting the tire with the rim, and wherein the said tire may, consequently, be readily attached to or detached from the rim.

And the invention has as a still further object to provide an improved rim of this character which will be simple in construction and which will be thoroughly efficient in use.

With these and other objects in view, my invention will be more fully described illustrated in the accompanying drawings and then specifically pointed out in the claims which are attached to and form a part of this application.

In the accompanying drawings:

Figure 1 is a sectional view of my improved rim, particularly illustrating the manner in which the rim is maintained in position upon the wheel, the portion of the felly of the wheel shown as well as the tire, being conventionally illustrated.

Fig. 2 is a side elevation showing a wheel with my improved rim mounted thereon,

Fig. 3 is a fragmentary plan view particularly illustrating the construction of the locking rings employed as well as the arrangement of the wedge used for maintaining the said rings in position,

Fig. 4 is a fragmentary perspective view showing the rim mounted upon a wheel,

Fig. 5 is a similar view illustrating the parts detached but in proper relative position, and

Fig. 6 is a fragmentary sectional view particularly showing the formation of the rim at the point where the valve stem of the tire is disposed to pass therethrough.

Corresponding and like parts are referred to in the following description and indicated in all the views of the drawing by the same reference characters.

In carrying out my invention, I employ inner and outer rims, the inner rim being connected with a wheel felly and the outer rim being disposed for detachable connection with the inner rim. Referring more particularly to the drawings, I have, for convenience, conventionally illustrated a wheel at 10, which is provided with a felly 11. Surrounding the felly is a band or ring 12 which, upon its opposite edges, is provided with flanges 13 disposed to engage the sides of the felly.

Mounted upon the band 12 at one side thereof, is a second band or ring 14 which is, as clearly shown in Fig. 1 of the drawings, of less width than the band 12 to provide a seat between the inner edge thereof and the adjacent edge of the band 12. The ring 14 may be secured to the band 12 in any suitable manner as by a plurality of rivets 15 and upon its outer edge, is provided with an upstanding annular flange 16 having a beveled inner face.

Formed in the inner edge of the ring 14, are a plurality of circumferentially spaced notches or recesses 17, which at one extremity each provide circumferentially extending undercut lugs or shoulders 18, a recess 19 being provided upon one side of the band having inwardly extending shoulders 18 at each extremity thereof, attention being directed to the fact, in this connection, that the shoulders 18 upon one side of the recess 19 are reversely disposed to those arranged upon the other side of the said recess. Disposed for detachable engagement within the recesses 17 and 19, is a sectional locking ring 20.

The ring 20 is formed of two semi-circular sections 21 and 22, as clearly illustrated in Fig. 2 of the drawings, and is disposed to be received within the seat formed at the inner edge of the ring 14, above referred to, with the inner edge of said locking ring abutting the inner edge of the ring 14, the said locking ring being provided with an upstanding flange 23 similar to the flange 16, which last mentioned flange is also provided with an inner beveled face.

Formed on the inner edge of the ring 20 are a plurality of laterally projecting lugs 24 which are each undercut at one extremity to provide circumferentially extending shoulders 25, each of said sections being provided at one extremity with a terminal lug having a shoulder formed thereon. Attention is now directed to the fact that the shoulders 25 upon the section 21 of the ring 20 are reversely arranged to the shoulders 25 upon the section 22, the shoulders of the sections being disposed for engagement with the oppositely arranged shoulders 18, it being noted that the terminal shoulders 25 of the locking ring and previously mentioned, are disposed for engagement with the oppositely disposed shoulders of the recess 19.

The adjacent extremities of the sections 21 and 22 disposed within the recess 19 are provided with oppositely inclined edges, as best shown in Fig. 3 of the drawings, and detachably engaging within the said recess to bear against the confronting edges of the sections, is a wedge 26. The wedge 26 is provided at one extremity, with an upstanding flange 27 disposed to form a continuation of the flange 23 and projecting from the lower face of the said wedge beneath the flange 27 to extend through a suitable notch formed in the band 12 as best shown in Fig. 5 of the drawings, is an ear 28, which, when the wedge is in position within the recess 19 in engagement with the sections 21 and 22 of the locking ring as shown in Fig. 2 of the drawings, is disposed to extend radially of the felly 11 to seat against the adjacent face thereof.

The ear 28 is centrally apertured as shown, to loosely receive one extremity of a bolt or other suitable fastening device 29, which is arranged to extend entirely through the felly transversely thereof and is detachably engaged within a suitable bore formed therein, it being noted that the nut carried by the bolt 29 is disposed to maintain the wedge 26 seated within the recess 19.

From the preceding description, it will be seen that by removing the bolt 29, the wedge 26 may then be removed to free the locking ring 20 when the sections 21 and 22 may then be moved toward each other circumferentially of the band 12 to disengage the shoulders 25 of said ring with the shoulders 18 formed on the ring 14 when the said locking ring may be removed, it being understood that the wedge 26, when inserted between the adjacent extremities of the sections of the ring within the recess 19, is disposed to move the said sections in an opposite direction and will maintain the shoulders formed on the said sections in secure engagement with the shoulders formed on the ring 14, and in this connection, attention is directed to the fact that but a single fastening means is employed in the form of the bolt 29, which is disposed to maintain the ring 20 in operative position upon the wheel. Consequently, it will be observed that the said ring may be easily and quickly attached or removed, as desired.

Coming now more particularly to describe the outer rim, I employ an annular band 30 upon the upper face of which is formed at one side thereof a seat 33, the said band upon its opposite side, being provided with an upstanding annular flange 32.

The band 30 is of a circumference to surround the inner rim and upon its inner face is provided with the transversely spaced and circumferentially extending annular shoulders 34, which are disposed to seat upon the inner rim as best illustrated in Fig. 1 of the drawings, the outer edges of said shoulders being provided with beveled faces disposed for engagement with the beveled faces of the flanges 16 and 23.

Formed in the inner edge of the seat 33 is a recess 35, which, at its extremities, provides longitudinally extending and oppositely arranged undercut shoulders 36 and upon each side of the recess 35, said seat is provided with a plurality of circumferentially spaced recesses 37 which provide upon each side of the recess 35, a plurality of oppositely arranged undercut shoulders 37', this construction also being similar to that found in the inner rim.

Detachably mounted within the seat 33 is a sectional ring 38, similar to the locking ring 20, the locking ring 38 also being formed of semi-circular sections, each of which is provided with lugs forming oppositely arranged shoulders 39, the shoulders of one of said sections being disposed for engagement with the shoulders 37 upon one side of the recess 35 while the shoulders of the other sections are disposed for engagement with the shoulders upon the other side of said recess, it being observed that the said sections are provided with terminal lugs providing shoulders disposed for engagement with the shoulders 36.

Formed on the ring 38 at one side thereof is an upstanding annular flange 40 disposed to confront the flange 32, and the adjacent extremities of the sections forming the said ring and disposed within the recess 35, are provided with oppositely inclined edges arranged for engagement with the wedge 41, which, at one extremity, is provided with an upstanding flange 42 disposed to form a continuation of the flange 40. Intermediate of its ends, the wedge 41 is provided with a suitable screw threaded bore disposed for engagement with the screw threaded shank of a locking screw 43, the locking screw 43 being arranged to extend loosely through a suitable bore formed in the band 30 and being preferably provided with a squared head disposed for engagement by a wrench or other tool.

It will thus be noted that the wedge 41 may be readily removed by first removing the screw 43 to release the locking ring 38 and in view of the preceding description concerning the mounting of the locking ring 20, the manner in which the present locking ring 38 may be applied or removed will be readily understood. However, attention is called to the fact that but a single fastening means is employed in the form of the screw 43 which is disposed to operatively maintain the locking ring 38 in position.

The band 30 of the outer rim is disposed to receive the tire, conventionally shown and indicated as a whole at 44 in Fig. 1 of the drawings, as well as the locking rings 45 therefor, also conventionally shown, and it will be seen that by removing the locking ring 38, the tire 44 may be easily and readily disconnected from the outer rim, while the said outer rim, may also, itself, be disconnected from the inner rim with equal facility.

Upon one side thereof and substantially opposite to the disposition of the wedge 26, the band 30 comprising the body portion of the outer rim, is bored to receive the valve stem, conventionally shown at 46 in Fig. 5 of the drawings, and said aperture is surrounded by a boss 47 disposed to project inwardly toward the inner rim to engage at its inner extremity within a suitable recess formed in the body portion of the said inner rim. The boss 47 is thus disposed to prevent circumferential creeping of the outer rim relative to the inner rim. Attention is also called to the fact that in thus arranging the boss 47, the valve stem 46 is disposed substantially opposite to the fastening device 29 to consequently tend to counter-balance the wheel.

What is claimed as new is:—

1. In a device of the character described, an inner rim including a body portion having an annular flange formed thereon and recessed to define a plurality of oppositely arranged and circumferentially extending shoulders, a sectional locking ring detachably mounted upon the body portion and having lugs formed thereon extending within said recesses and provided with oppositely disposed shoulders engaging said first mentioned shoulders, a wedge detachably engaging between adjacent extremities of said ring, said locking ring being provided with an annular flange confronting said first mentioned flange, and an outer rim carried by said inner rim and disposed to detachably receive a tire, said outer rim upon its inner face being provided with spaced annular shoulders engaging between said flanges.

2. In a device of the character described, an inner rim including a body portion having a flange formed on one side margin thereof and having its opposite margin cut away to provide a locking ring seat, there being recesses formed in the body portion and opening into said seat, the recesses defining oppositely disposed shoulders upon the body portion, a flanged locking ring having lugs formed on one margin thereof extending into said recesses and provided with oppositely disposed shoulders engaging said first mentioned shoulders, a locking member for the ring, and an outer rim carried by the inner rim and provided with shoulders engaging between the flange of the ring and the flange of the body portion, the outer rim being adapted to receive a tire.

3. A wheel rim including an annular body portion provided with reversely arranged shoulders, a sectional locking ring coacting with the body portion and provided with reversely arranged shoulders engaging said first mentioned shoulders, and locking means for said ring, the said rim being disposed to receive an outer rim with a portion of the outer rim contacting with the ring adjacent the shoulders thereof for holding the shoulders of the ring in active position.

In testimony whereof I affix my signature in presence of two witnesses.

GEORGE H. PARKS. [L. S.]

Witnesses:
DeWitt S. Pinch,
John Vegter.